(12) United States Patent
Li et al.

(10) Patent No.: US 12,103,785 B2
(45) Date of Patent: Oct. 1, 2024

(54) AUTOMATIC FEEDING DEVICE FOR AUTOMOTIVE WHEEL HUB

(71) Applicants: QINGDAO UNIVERSITY OF TECHNOLOGY, Shandong (CN); IK GUJRAL PUNJAB TECHNICAL UNIVERSITY, Jalandhar (IN)

(72) Inventors: Changhe Li, Qingdao (CN); Minkai Chen, Qingdao (CN); Zongming Zhou, Qingdao (CN); Bo Liu, Qingdao (CN); Yun Chen, Qingdao (CN); Huajun Cao, Qingdao (CN); Shubham Sharma, Jalandhar (IN); Naiqing Zhang, Qingdao (CN); Qidong Wu, Qingdao (CN); Teng Gao, Qingdao (CN); Yanbin Zhang, Qingdao (CN); Mingzheng Liu, Qingdao (CN); Xiaoming Wang, Qingdao (CN); Min Yang, Qingdao (CN); Hao Ma, Qingdao (CN); Xifeng Wu, Qingdao (CN)

(73) Assignees: QINGDAO UNIVERSITY OF TECHNOLOGY, Qingdao (CN); IK GUJRAL PUNJAB TECHNICAL UNIVERSITY, Jalandhar (IN)

( * ) Notice: Subject to any disclaimer, the term of this patent is extended or adjusted under 35 U.S.C. 154(b) by 263 days.

(21) Appl. No.: 17/729,492

(22) Filed: Apr. 26, 2022

(65) Prior Publication Data
US 2023/0027199 A1    Jan. 26, 2023

(30) Foreign Application Priority Data
Jul. 20, 2021    (CN) .......................... 202110820717.0

(51) Int. Cl.
*B65G 47/90* (2006.01)
*B65G 47/42* (2006.01)
*B65G 57/03* (2006.01)

(52) U.S. Cl.
CPC ........... *B65G 47/42* (2013.01); *B65G 47/901* (2013.01); *B65G 47/905* (2013.01); *B65G 57/03* (2013.01);
(Continued)

(58) Field of Classification Search
CPC .... B65G 47/42; B65G 47/901; B65G 47/905; B65G 57/03; B65G 2201/0294;
(Continued)

(56) References Cited

FOREIGN PATENT DOCUMENTS

| CN | 101435745 | * | 5/2009 | ............ G01M 17/02 |
| CN | 103496567 A | | 1/2014 | |

(Continued)

*Primary Examiner* — Lynn E Schwenning
(74) *Attorney, Agent, or Firm* — JCIPRNET

(57) ABSTRACT

Provided an automatic feeding device for automotive wheel hub, comprising a separable material rack having material rack units capable of being stacked in turn, a first roller table for conveying the separable material rack containing the wheel hub to a second roller table, and a material rack separating device having a support frame and material rack inserting and taking devices; the second roller table, under which a lifting platform is mounted, is located at a first end of lower part of the material rack inserting and taking device; the material rack inserting and taking device splitting the separable material rack into units, and placing to a third roller table being arranged at a second end of the lower part thereof; a manipulator, for grasping and placing the wheel hub from the material rack unit to a fourth roller table being on a second side thereof.

9 Claims, 13 Drawing Sheets

(52) U.S. Cl.
CPC ............... *B65G 2201/0294* (2013.01); *B65G 2811/0663* (2013.01)

(58) Field of Classification Search
CPC ........ B65G 2811/0663; B65G 2201/02; B65G 47/90; B65G 59/067; B65G 47/06; B65D 21/0215; B65D 85/02
See application file for complete search history.

(56) References Cited

FOREIGN PATENT DOCUMENTS

| | | | | |
|---|---|---|---|---|
| CN | 205226108 U | | 5/2016 | |
| CN | 205855331 U | | 1/2017 | |
| CN | 111252560 | * | 6/2020 | ............. B65G 59/06 |
| CN | 212923318 U | | 4/2021 | |

* cited by examiner

AUTOMATIC FEEDING DEVICE FOR AUTOMOTIVE WHEEL HUB

CROSS-REFERENCES TO RELATED APPLICATIONS

This application claims priority benefits to Chinese Patent Application No. 202110820717.0, filed 20 Jul. 2021, the contents of which are incorporated herein by reference.

TECHNICAL FIELD

The present invention relates to the field of automotive wheel hub processing, and in particular to an automatic feeding device for automotive wheel hub.

BACKGROUND

As the starting end of the hub machining workshop, the wheel hub automatic feeding device is an essential part. And for automatic production lines, reducing the use of workers and improving production efficiency, a fast and efficient feeding device is indispensable. At present, in most small and medium-sized companies, the feeding and unloading, and transportation of the wheel hubs are completed still by workers, so that there only reduces the efficiency, but also increases the workload of the workers.

In the prior art, the patent CN201521040907.7 disclosed a bearing retainer feed mechanism, which comprises a base carousel, a material rack, a horizontal manipulator and a vertical manipulator. The material rack is lifted axially by the vertical manipulator, and the material is transported by the horizontal manipulator to realize the feeding. Although this bearing retainer feed mechanism can feed the materials continuously, a pushing claw needs to move up and out of the material rack after it finishes feeding the workpiece on the material rack, then the base carousel can rotate and switch to the next material rack. During this period, the pushing claw is always under the bearing retainer; therefore, the base carousel can only rotate after the last bearing retainer on the material rack is fed. Although a workpiece on the last bearing retainer is a defective product, it still needs to be fed, and then the pushing claw can be removed before the base carousel can be rotated for the replacement of the material rack, so that the defective product would enter the machining part, which causes unnecessary damage to the processing equipment in the workshop. The patent CN201620776266.X disclosed a wheel hub loading attachment, which comprises a frame, an arm component of lifting, a translation subassembly and a clamping jaw subassembly. During the loading, only the wheel hub on the top of the material rack is loaded every time, and after loading once, the lower wheel hub moves upward, realize the loading from the top. If the material rack needs to be replaced, just keep the material rack away from the device, and rotate it, and then move it back. Although this patent can complete the continuous loading, it can only complete the loading for the wheel hubs already on the material rack, without considering how the wheel hubs appear on the material rack, that is, the wheel hubs, which has completed the processing, can only be put into the material rack through handling. And the material rack is a fixed cylinder without layering, so that the material rack cannot be used after being separated from the loading attachment, which will reduce the efficiency and cannot meet the demand of continuous loading. The patent CN202020714500.2 disclosed an intelligent mechanical automatic feeding device, wherein the feeding process of this feeding device is completed through the vacuum pumping of the vacuum machine to tightly adsorb the materials, and then through the cooperation of gears and support slide rails, etc. However, this device adopts vacuum adsorption, which cannot adsorb curved surfaces and complex surfaces, so it has great limitations, and can only feed the materials placed on the surface of the material rack. If the material rack is divided into multiple layers, this device cannot complete the feeding function. The patent CN201310489461.5 disclosed an automatic feeding device, which feeds the materials randomly through a mechanical vibration, and vibrates the materials whose posture does not meet the requirements again. Therefore, it has strong universality and can adapt to a variety of materials with different shapes. However, this device has poor function in the continuous feeding of processing, and cannot meet the requirements of continuous work.

To sum up, at present, the feeding of the automobile wheel hub feeding is mostly handled manually, which is inefficient and has a heavy workload. The existing feeding devices have some problems that need to be overcome and are not convenient to use in the factory. For example, the replacement of the material rack is not convenient enough, the material rack cannot meet the performance of storing the wheel hubs after being separated from the feeding device, there may be instability when the feeding device grabs the material, the wheel hubs may be damaged in the feeding process, and the efficiency and stability in the feeding process cannot be guaranteed and so on.

SUMMARY

For existing technology that existed in the inadequacies, the present invention provides an automatic feeding device for automotive wheel hubs, which can realize a storage of material rack by a separable material rack, and the separable material rack can be split into multiple material rack units through the cooperation of a roller table, a lifting platform and a material rack separating device, so as to facilitate fast clamping and transportation of the wheel hubs and improves the loading efficiency.

In order to achieve the above-mentioned purpose, the present invention is realized by the following technical solutions:

An embodiment of the present invention provided an automatic feeding device for automotive wheel hub, comprising:

a separable material rack, comprising at least two layers of material rack units capable of being stacked in turn;

a first roller table for conveying the separable material rack with wheel hubs to a second roller table; a lifting platform is mounted under the second roller table;

a material rack separating device, comprising a support frame and at least two material rack inserting and taking devices arranged at intervals along a height direction of the support frame; the second roller table is located at a first end of lower part of the material rack inserting and taking device, a third roller table is arranged perpendicular to the direction of transmission of the second roller table at a second end below the material rack inserting and taking device;

wherein, the separable material rack transported to the second roller table being split into several material rack units by the material rack inserting and taking device under the action of the lifting platform, and the material rack units being placed on the third roller table; a manipulator is provided on a first side of the third roller table, to grasp the wheel hub on the material rack unit and place the wheel hub on a fourth roller table provided on a second side of the manipulator.

As a further implementation, the material rack unit comprises a base plate and stacking support legs distributed circumferentially along an upper surface of the base plate, a first end of the stacking support leg being removably connected to the base plate and a second end of the stacking support leg being plugged to the base plate of the adjacent material rack unit.

As a further implementation, a plurality of wheel hub positioning plates are mounted on the upper surface of the base plate, and a number of inserting and taking slots of the separating device are provided on a side of the base plate;

a first mounting slot adapted to the stacking support leg is provided on a position closed to an end of the upper surface of the base plate, and a second mounting slot is provided on the lower surface of the base plate corresponding to the position of the first mounting slot, and a bearing-like seat (i.e. comprising a clearance fit seat connected to the stacking support leg being mounted in the second mounting slot, and a ball pair mechanism being provide on inside the seat) for plug-in connection with the stacking support leg is mounted in the second mounting slot.

As a further implementation, an upper surface of the wheel hub positioning plate is provided with a plurality of positioning shafts of which the axis lines are perpendicular to the upper surface; the bearing-like seat comprises a seat inner frame, a seat outer frame and a roller mounted between the two frames and protruding from a surface of the seat inner frame.

As a further implementation, the material rack inserting and taking device is connected to a Y-axis power device of the material rack by a timing belt synchronizing device, the Y-axis power device of the material rack is mounted along a length direction of the support frame, and the material rack inserting and taking device can move along the length direction of the support frame under the action of the Y-axis power device.

As a further way of implementation, the material rack inserting and taking device comprises a top plate, an inserting and taking module, a cylinder and a track; the track is mounted on a bottom surface of the top plate, the inserting and taking module is slidingly connected to the track, the cylinder is connected to the inserting and taking module, the inserting and taking module can move along the length direction of the track under the action of the cylinder, and the moving direction of the inserting and taking module is perpendicular to the length direction of the support frame.

As a further way of implementation, the inserting and taking module comprises a mounting plate, a caterpillar band transmission mechanism and a load bearing assembly; the load bearing assembly is connected to the mounting plate through the caterpillar band transmission mechanism, the mounting plate is slidingly connected to the track; the caterpillar band transmission mechanism can drive the lifting of the load bearing assembly.

As a further implementation, a baffle is mounted at one end of the second roller table away from the first roller table, and a positioning plate is provided on a side of the baffle near the second roller track, and the positioning plate is connected to a cylinder; the second roller track is mounted with a displacement sensor.

As a further way of implementation, the lifting platform comprises a lifting top plate, a lifting bottom plate and a scissor structure, the lifting top plate and the lifting bottom plate are connected by two sets of the scissor structure; and one of the diagonal ends of the scissor structure is mounted with rollers, and the corresponding rollers of the two sets of the scissor structures are connected with each other by connecting shaft; the connecting shaft is connected with a cylinder.

As a further realization, the manipulator comprises a bracket, a plurality of clamping devices; the clamping devices are connected to a body frame through a moving frame; and the moving frame is connected to the Y-axis moving device.

The beneficial effects of the present invention are as follows.

(1) The lifting platform set under the second roller table of the present invention can lift a total height of a set number of material racks each time, so as to realize the separation of the material racks by the material rack separating device; through the cooperation of the roller table, the lifting platform and the material rack separating device, the material racks can be mechanically disassembled layer by layer quickly, and the each layer of the disassembled material rack can be transported to and placed on the roller table at another end, so as to facilitate the clamping of the wheel hubs; through the cooperative work of each the device, the feeding task of automotive wheel hubs can be completed quickly, efficiently and continuously.

(2) The separable material rack of the present invention consists of several layers of material rack units, through the plug-in between adjacent material rack units, the separation of each layer can be realized, which has good separability; the set bearing-like seat has a ball roller, which is convenient to adjust the installation height between the material rack units; there can facilitate the clamping and loading of the wheel hubs after the separable material rack is divided into frame units; and the separable material rack being provided with a positioning plate, of which the positioning axis can carry out a flexible storage for the wheel hubs with different sizes, which has an excellent storage performance.

(3) The material rack separating device of the present invention can realize the movement of the load bearing assembly in three directions of XYZ axis through the cooperation of the material rack inserting and taking device and Y-axis moving device, so as to disassemble the material rack; it can realize a continuous work through multiple material rack inserting and taking devices to improve a separation efficiency of the material rack.

(4) The manipulator of the present invention being provided with a plurality of clamping devices, can clamp multiple wheel hubs at the same time; the clamping devices are provided with moving frames, and the moving frames are connected with timing belt mechanism, the position of the moving frames can be changed through the timing belt mechanism, which can avoid the influence of the moving frames on the action of the material rack inserting and taking device and improve the efficiency of the cooperation between the devices.

BRIEF DESCRIPTION OF THE DRAWINGS

The accompanying drawings forming part of the present invention are used to provide a further understanding of the present invention. The schematic embodiments of the present invention and their descriptions are used to explain the present invention and do not constitute an undue limitation of the present invention.

Wherein, I, separable material rack; II, material rack separating device; III, first roller table; IV, second roller table; V, lifting platform; VI, manipulator; VII, fourth roller table; XI, hub; VIII, third roller table.

I-1, material rack inserting and taking bottom plate; I-1-1, forklift inserting and taking slot; I-1-2, separating device inserting and taking slot; I-1-4, stacking frame mounting slot; I-2, material rack stacking bottom plate; I-2-1, first mounting slot; I-2-2, separating device inserting and taking slot; I-4, wheel hub positioning plate; I-4-2, positioning shaft; I-5, stacking frame; I-5-1, threaded hole; I-7, seat inner frame; I-8, seat outer frame; I-9, ball roller; II-1, frame separating support leg; II-2, frame inserting and taking device; II-2-1, load bearing assembly; II-2-3, caterpillar band; II-2-10, caterpillar band gear; II-2-13, mounting plate; II-2-14, track slot; II-2-16, motor; II-2-17, motor mount; II-2-20, chain; II-2-21, sprocket; II-2-22, caterpillar band synchronizer; II-2-23, caterpillar band synchronizer; II-2-33, caterpillar band.

II-3, timing belt synchronizing device; II-4, material rack Y-axis power unit; II-4-1, motor; II-4-2, coupling; II-4-3, motor mount; II-4-4, timing belt; II-4-5, driving unit frame; II-4-6, driven pulley; II-5, Y-axis moving track slot; II-6, top plate; II-7, triangle connector; II-8, frame top plate; II-9, track; II-10, cylinder; III-1, roller table leg; III-2, roller; III-3, mounting plate; III-3-1, mounting hole; III-3-2, face; III-3-3, threaded hole; III-4, bottom plate; III-6, chain; III-8, motor mount; III-9, motor; III-10, displacement sensor.

IV-1, cylinder; IV-2, positioning plate; IV-3, stop plate; IV-4, base plate; IV-5, chain; IV-6, mounting plate; IV-7, motor mount; IV-8, motor; IV-10, displacement sensor; IV-11, displacement sensor; V-1, lift base plate; V-2, roller; V-3, connecting shaft; V-4, cylinder; V-5, connecting rod; V-6, connecting pin; V-7, mounting frame; V-8, lifting top plate; VI-1, bracket; VI-2, clamping device; VI-2-1, jaws; VI-2-2, mounting platform; VI-2-4, connecting rod; VI-2-5, connecting frame; VI-2-7, connecting frame; VI-2-8, slide; VI-2-9, bracket; VI-2-10, cylinder; VI-2-11, slider; VI-2-15, cylinder; VI-3, Y-axis moving device; VI-3-1, connecting frame; VI-3-2, timing belt mechanism.

DETAILED DESCRIPTION

Example 1

Figure 1:
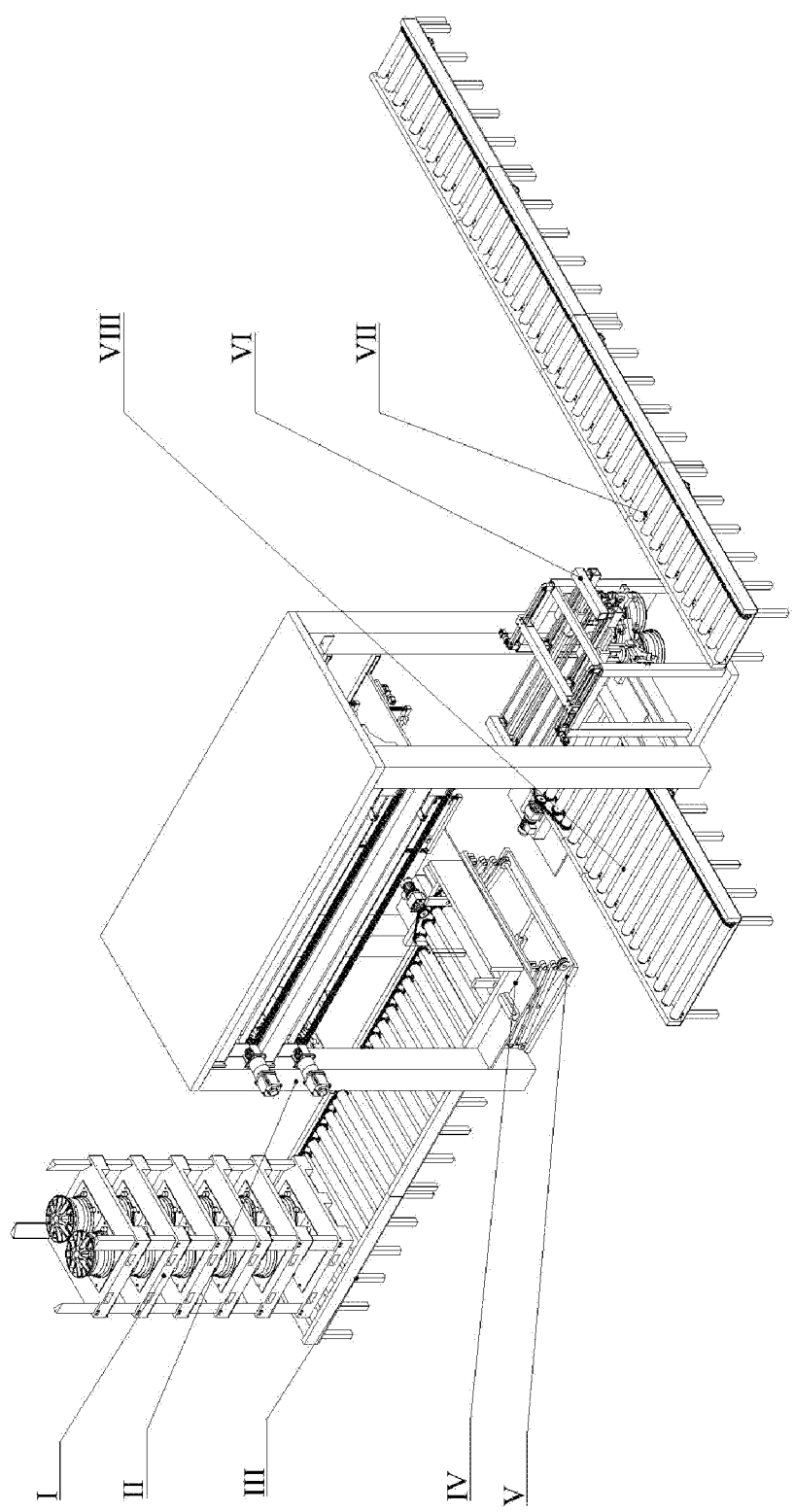
FIG. 1 is an overall schematic view of one or more embodiments of the present invention.

The present embodiment provided an automatic loading device for automotive wheel hubs, as shown in FIG. 1, including a separable material rack I, a material rack separating device II, a first roller table III, a second roller table IV, a lifting platform V, a manipulator VI, a third roller table VIII, a fourth roller table VII. The separable material rack I is used to load a wheel hub XI, and is transferred through the first roller table III; the fourth roller table VII is provided at a first end of the first roller table III, and the lifting platform V is mounted below the fourth roller table VII. The fourth roller table VII is located at an inlet end of the material rack separating device II, and the third roller table VIII is provided at an outlet end of the material rack separating device II, and transmission directions of the first roller table III and the third roller table VIII are perpendicular to each other. The fourth roller table VII is parallel to the transmission direction of the third roller table VIII, and the manipulator VI is located between the third roller table VIII and the fourth roller table VII. The material rack separating device II is used to split the separable material rack I, the first roller table III and the second roller table IV are used to transport the separable material rack I, and the manipulator IV is used to grasp the wheel hub XI. The wheel hub XI grasped by the manipulator IV is transported through the fourth roller table VII.

Figure 2:
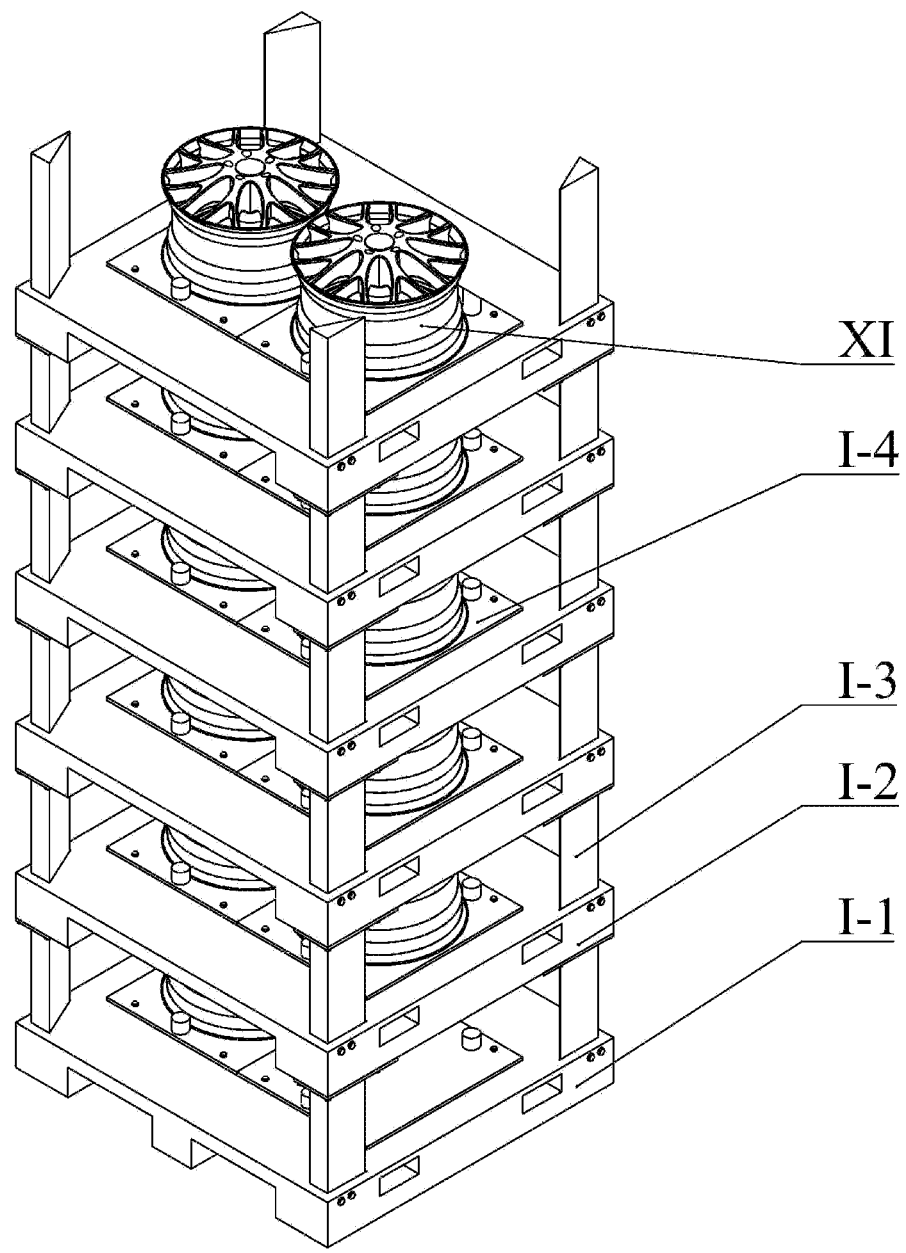
FIG. 2 is a three-dimensional view of a separable material rack in one or more embodiments of the present invention.

Further, as shown in FIG. 2, the separable material rack I comprises at least two layers of material rack units, the material rack unit at the bottom in the present embodiment is a bottom material rack, and the material rack units above the bottom material rack are stacking material racks, then the separable material rack I comprised one the bottom material rack and several stacking material racks mounted on a top of the bottom material rack, and a number of layer of the stacking material rack depends on the number of the wheel hub XI to be transported. For example, the stacking material racks being provided with five layers to form the separable material rack I with a six-layer structure.

The bottom material rack comprised a material rack inserting and taking bottom plate I-1, a wheel hub positioning plate I-4 mounted above the material rack inserting and taking bottom plate I-1, and stacking support legs are distributed along a circumference of the material rack inserting and taking bottom plate I-1; the stacking material rack comprised a material rack stacking bottom plate I-2, a wheel hub positioning plate I-4 mounted above the material rack stacking bottom plate I-2, and the stacking support legs are distributed along the circumference of the material rack stacking bottom plate I-2. The bottom material rack and the stacking material rack, and the adjacent stacking material racks all are connected through the cooperation of the stacking support legs and the class bearing-like seat. The stacking support legs are evenly distributed along the circumferential directions of both the bottom material rack and the stacking material rack. In the present embodiment, there four stacking support legs were mounted between adjacent layers of the material racks, and evenly distributed in the circumferential direction.

For the support stability, the stacking support leg of the present embodiment is a stacking frame I-5, the stacking frame I-5 is a triangular prism shape, and a cross-section thereof is a triangular. In the present embodiment, a first end of the stacking frame I-5 of the bottom material rack is connected to the material rack inserting and taking bottom plate I-1 through screws, and a second end of the stacking frame is connected to the bearing-like seat in the stacking frame.

Figure 3:
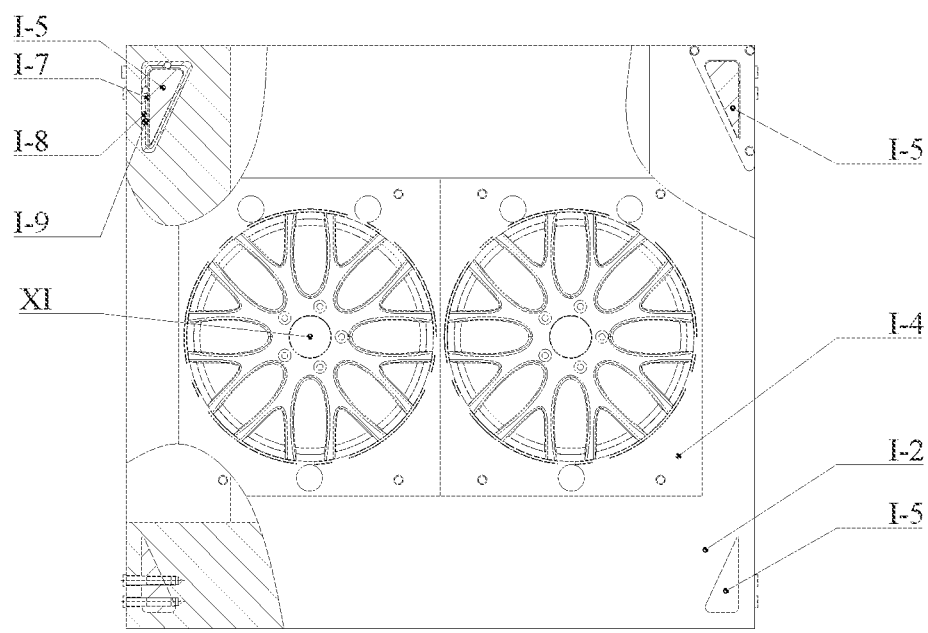
FIG. 3 is a partial sectional view of the separable material rack in one or more embodiments of the present invention.
Figure 4:
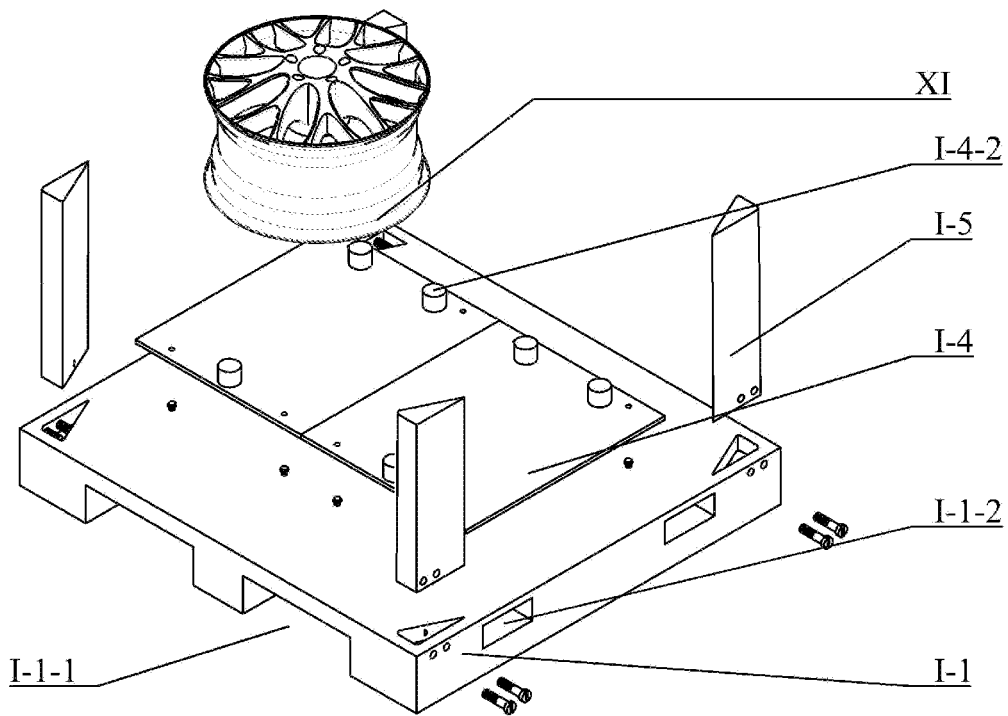
FIG. 4 is an exploded view of a bottom frame of the separable material rack in one or more embodiments of the present invention.

Further, as shown in FIGS. 3 and 4, the bottom material rack takes the material rack inserting and taking bottom plate I-1 as the main body, and an upper surface of the material rack inserting and taking bottom plate I-1 is provided with a stacking material rack mounting slot I-1-4. The stacking material rack mounting slot I-1-4 is set near an end of the material rack inserting and taking bottom plate I-1. In the present embodiment, the upper surface of the material rack inserting and taking bottom plate I-1 is a rectangular plane, and the stacking material rack mounting slots I-1-4 are distributed in four corners of the upper surface of the material rack inserting and taking bottom plate I-1. The stacking frame mounting slot I-1-4 is used to install the stacking frame I-5, that is, put the stacking frames I-5 into the stacking frame mounting slots I-1-4 and fix them with screws or other methods. The wheel hub positioning plate I-4 is fixed to an upper plane of the material rack inserting and taking bottom plate.

Further, a bottom surface of the material rack inserting and taking bottom plate I-1 is provided with a plurality of forklift inserting and taking slots I-1-1 which are parallel to each other and running from a first end to a second end of the material rack inserting and taking bottom plate I-1; a side of the material rack inserting and taking bottom plate I-1 perpendicular to the penetration direction of the forklift inserting and taking slots I-1-1 is provided a plurality of separating device inserting and taking slots I-1-2. In the present embodiment, there are two forklift inserting and taking slots I-1-1 and separating device inserting and taking slots I-1-2 respectively. The forklift inserting and taking slot I-1-1 is used for the insertion and taken by the forklift, when filled with the wheel hubs XI and needed to enter the machine shop, the separable material racks I-1 can be transported by the forklift. The separating device inserting and taking slots I-1-2 are used for the material rack separating device II separating the material rack during the loading process.

Figure 5:
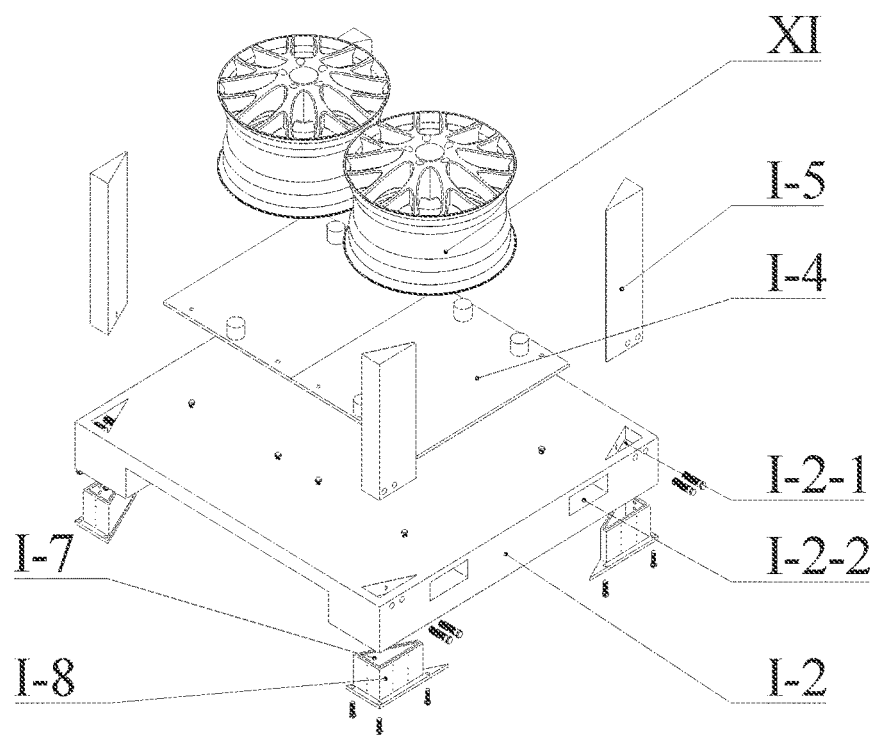
FIG. 5 is an exploded view of a stackable material rack of the separable material rack in one or more embodiments of the present invention.

Further, as shown in FIG. 5, the stacking material racks takes the material rack stacking base plate I-2 as the main body, four corner positions of an upper surface of the material rack stacking base plate I-2 are provided with first mounting slots I-2-1, a shape of the first mounting slot I-2-1 is suitable for the shape of the stacking frame I-5; the positions on a lower surface of the material rack stacking base plate I-2 corresponding to the first mounting slot I-2-1 are provided with second mounting slots, and a size of the second mounting slot is larger than the first mounting slot I-2-1; bearing-like seat mounted inside the second mounting slot for connecting with the stacking frame I-5 of the adjacent material rack.

The separating device inserting and taking slot I-2-2 is used for the material rack separating device II to separate the material racks during the loading process, which is provided on the side of the material rack stacking base plate I-2 and runs through the stacking base plate I-2. When the stacking material rack is mounted on the top of the bottom material rack, a setting direction of the separating device inserting and taking slot I-2-2 may be consistent with the separating device inserting and taking slot I-1-2. The upper plane of the material rack stacking bottom plate also is provide with the wheel hub positioning plate I-4 for positioning the wheel hub XI.

In the present embodiment, the wheel hub positioning plate I-4 is set as a rectangular plate, and an upper plane I-4-1 of the wheel hub positioning plate I-4 is provided with a plurality of positioning shafts I-4-2 of which axes are perpendicular to the wheel hub positioning plate I-4. Preferably, three positioning shafts I-4-2 are provided to form a triangular distribution; an outer edge of wheel hub XI is positioned similar to the shaft sleeve through the three positioning shafts I-4-2, which can limit the movement of X-axis and Y-axis, so as to limit the wheel hub XI to the determined position on the material rack and prevent it from moving.

Figure 6:
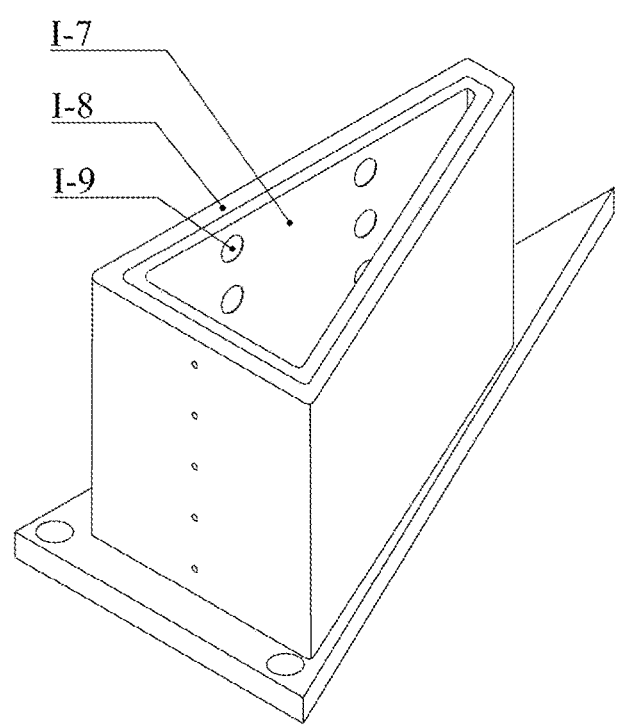
FIG. 6 is a shaft side view of a bearing-like seat in one or more embodiments of the present invention.

Further, as shown in FIG. 6, the bearing-like seat comprises a seat inner frame I-7, a seat outer frame I-8 and a ball roller I-9. The seat inner frame I-7 and the seat outer frame I-8 are hollow inside, and cross sections thereof are triangular, and the seat inner frame I-7 is set on an inside of the seat outer frame I-8. Both side walls of the support inside frame I-7 and the support outside frame I-8 are provided correspondingly with a number of ball roller grooves, a ball roller I-9 is mounted in the ball roller groove. A structure of the bearing-like seat is similar to a bearing, which is convenient for the stacking frame I-5 to enter and being taken out, and easy to split and re-assemble the material rack.

An inner triangular surface of the seat outer frame I-8 is fitted with the outer triangular surface of the seat inner frame I-7, and the outer triangular surface of the seat outer frame I-8 is fitted with the second mounting slot. The stacking frame I-5 can complete an X-axis lifting and lowering in a hollow chamber of the bearing-like seat; the splitting and re-assembly of the material rack can be completed through the lifting and lowering of the stacked frame I-5.

Figure 7:
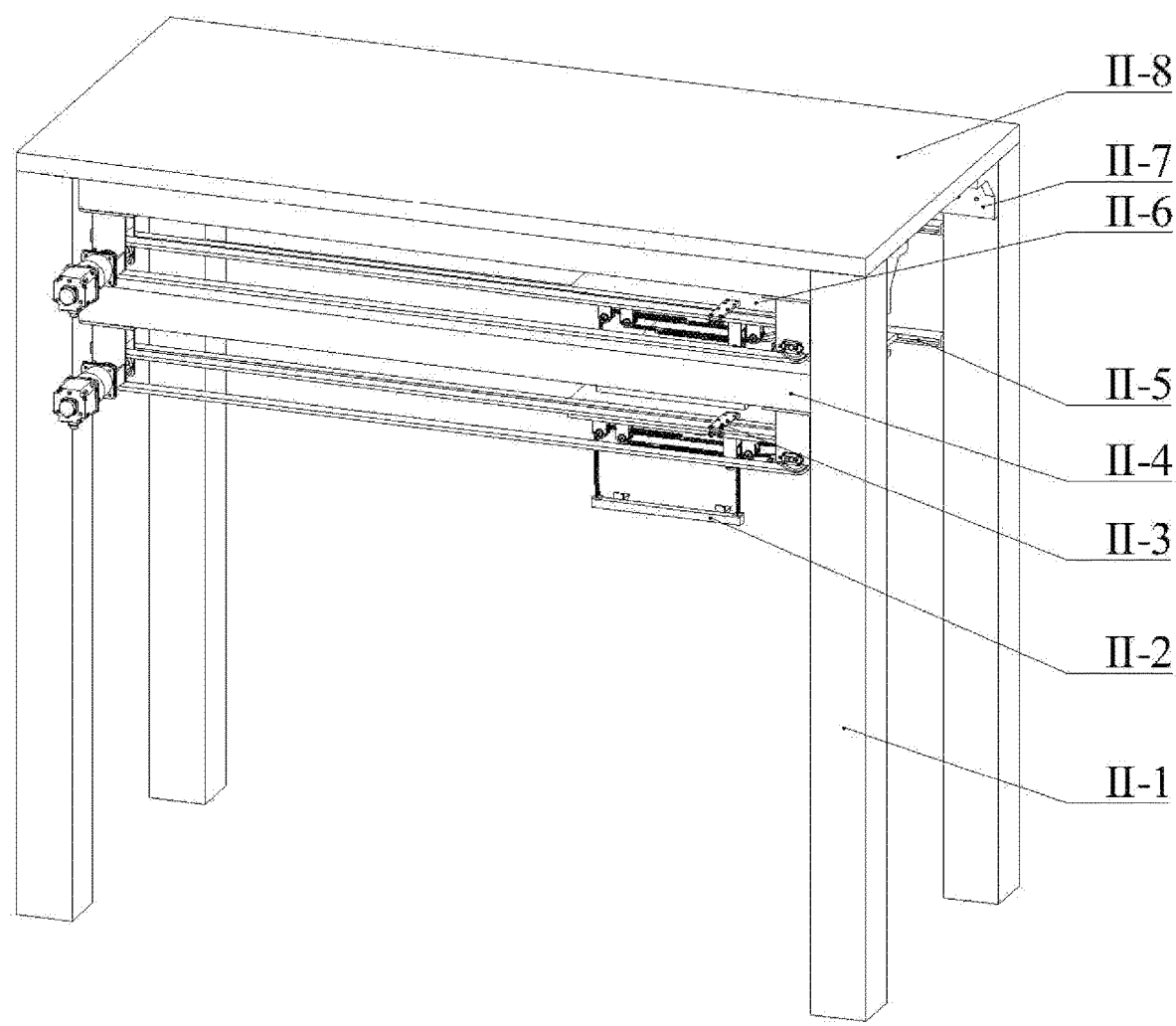
FIG. 7 is a three-dimensional view of a material rack separating device in one or more embodiments of the present invention.

Further, as shown in FIG. 7, the material rack separating device II is using the material rack separating support legs II-1 and the material rack top plate II-8 as a frame, and composed of the material rack inserting and taking device II-2, the timing belt synchronizing device II-3, and the material rack Y-axis power device II-4, etc. The material rack separating support legs II-1 are threaded to the material rack top plate II-8 through the triangle connection member II-7 to form the frame.

In the present embodiment, the material rack top plate II-8 is a rectangular plate, and the material rack separating support leg II-1 has four and are mounted at the bottom four corners of the material rack top plate II-8. A length direction of the material rack top plate II-8 is the Y direction and a width direction is the X direction. A plurality of groups of material rack inserting and taking devices II-2 are mounted on the frame from top to bottom to realize continuous work. The material rack inserting and taking device II-2 is connected to the material rack Y-axis power device II-4 through the timing belt synchronizing device II-3, and the material rack Y-axis power device II-4 is mounted along the length direction of the material rack top plate II-8.

The present embodiment takes two sets of material rack inserting and taking devices II-2 as an example for detailed description.

The material rack Y-axis power device II-4 is mounted between two the material rack separating support legs II-1 on a side of the X direction of the material rack top plate II-8, and a Y-axis moving track slot II-5 corresponding to the mounted material rack Y-axis power device II-4 is mounted on other side. The top plate II-6 is connected between the material rack Y-axis power device II-4 and the Y-axis moving track slot II-5, and the top plate II-6 can move along the Y-axis moving track slot II-5 under an action of the Y-axis power device II-4.

Figure 8:
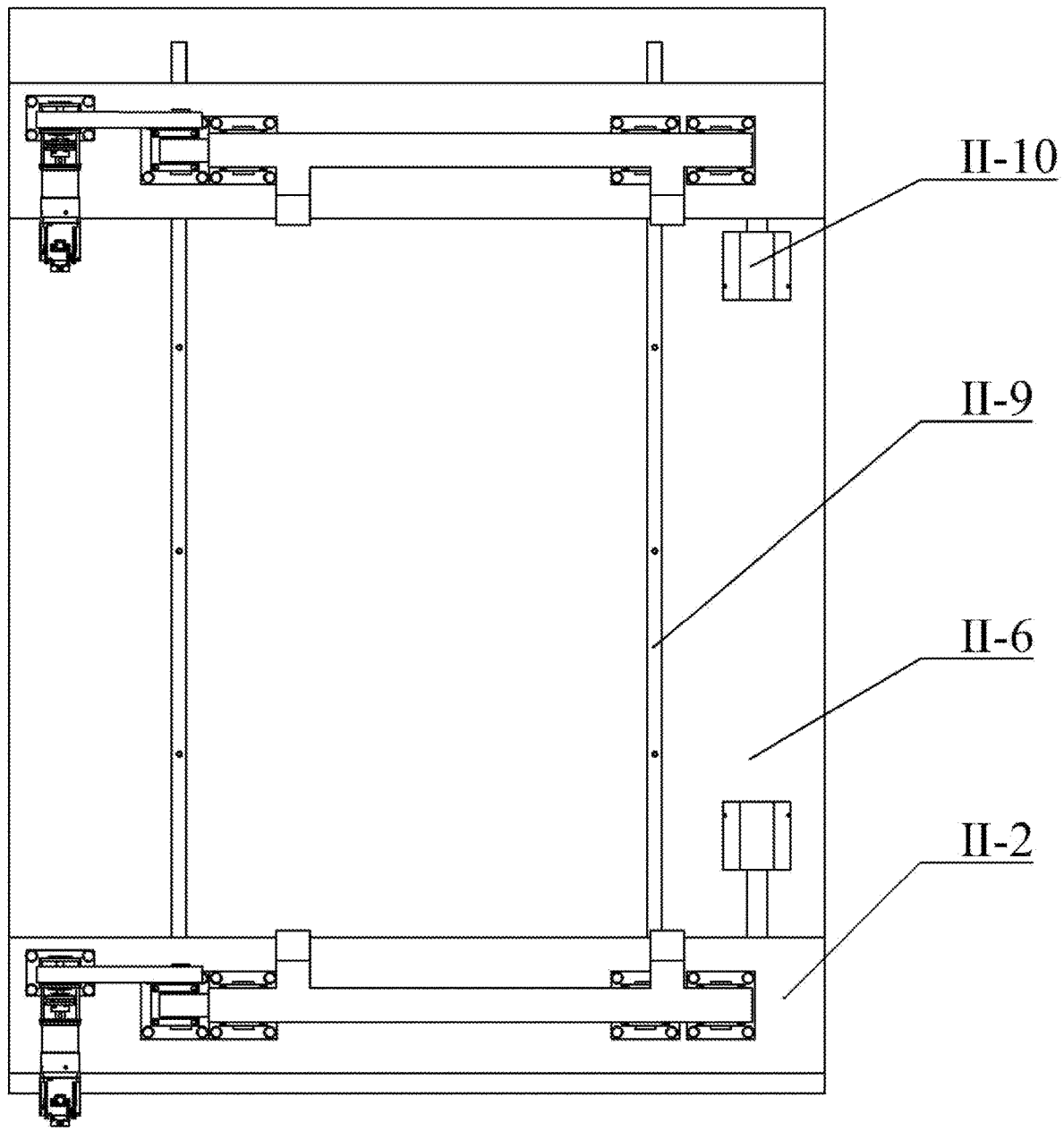
FIG. 8 is a schematic diagram of working parts of the material rack separating device in one or more embodiments of the present invention.

As shown in FIG. 8, the material rack inserting and taking device II-2 comprises a top plate II-6, an inserting and taking module, a cylinder II-10, and a track II-9; in the present embodiment, the top plate II-6 is set as a rectangular plate, and two tracks II-9 are mounted at intervals along a length direction of a bottom surface of the top plate II-6, and the inserting and taking module is slidingly connected with track II-9. The cylinder II-10 is mounted at two ends of the track II-9, and the cylinder II-10 is removably connected to the top plate II-6, and a cylinder rod of the cylinder II-10 is connected to the inserting and taking module; the inserting and taking module is driven to move along the length of the track II-9 by the cylinder II-10. After the top plate II-6 is mounted, the track II-9 is set along the X direction. The top plate II-6 is mounted between the two Y-axis moving track slots II-5, and a Y-axis movement of the top plate II-6 is completed in the Y-axis moving track slot II-5.

Figure 9:
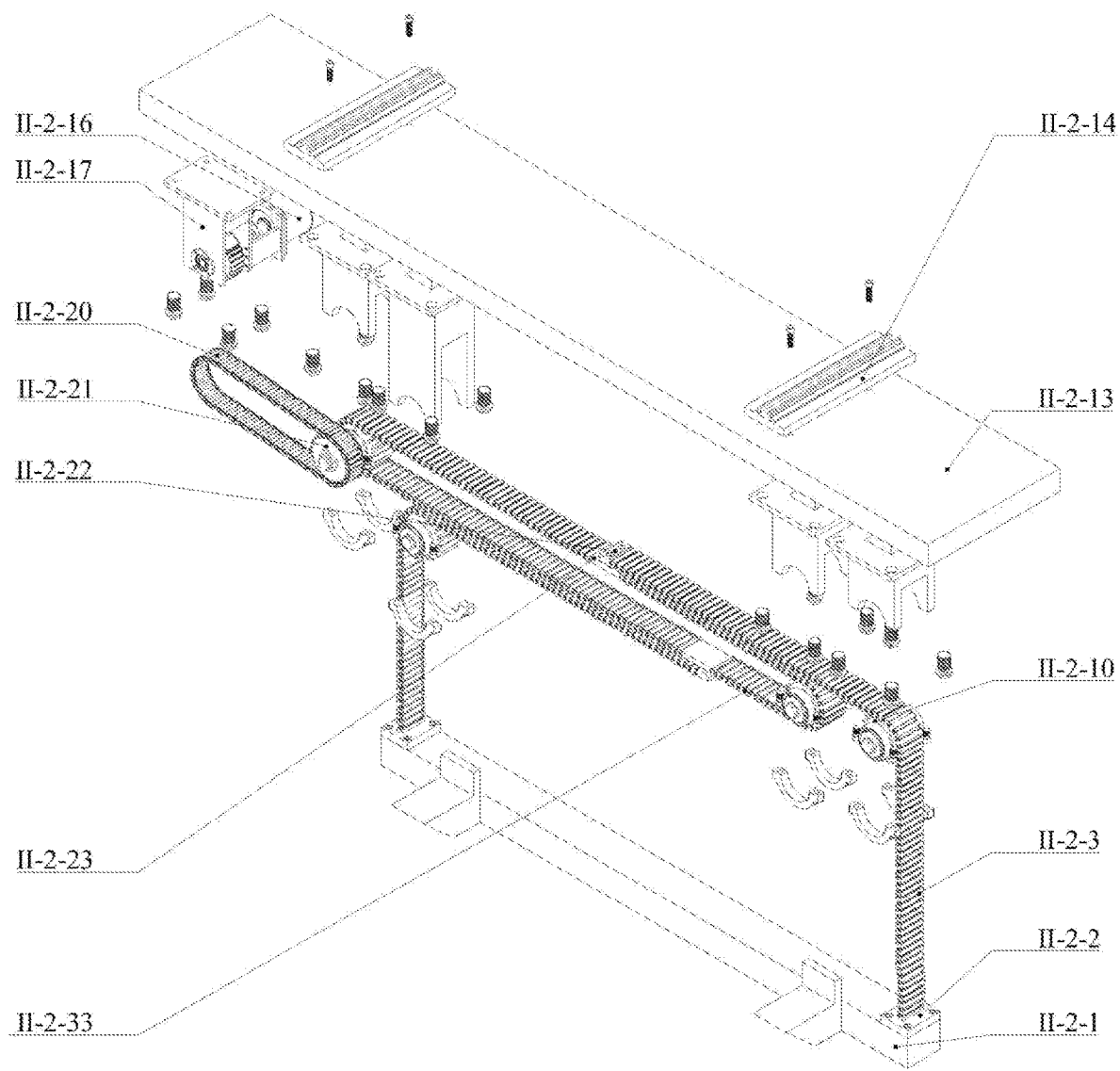
FIG. 9 is an exploded view of a material rack inserting and taking device in one or more embodiments of the present invention.
Figure 10:
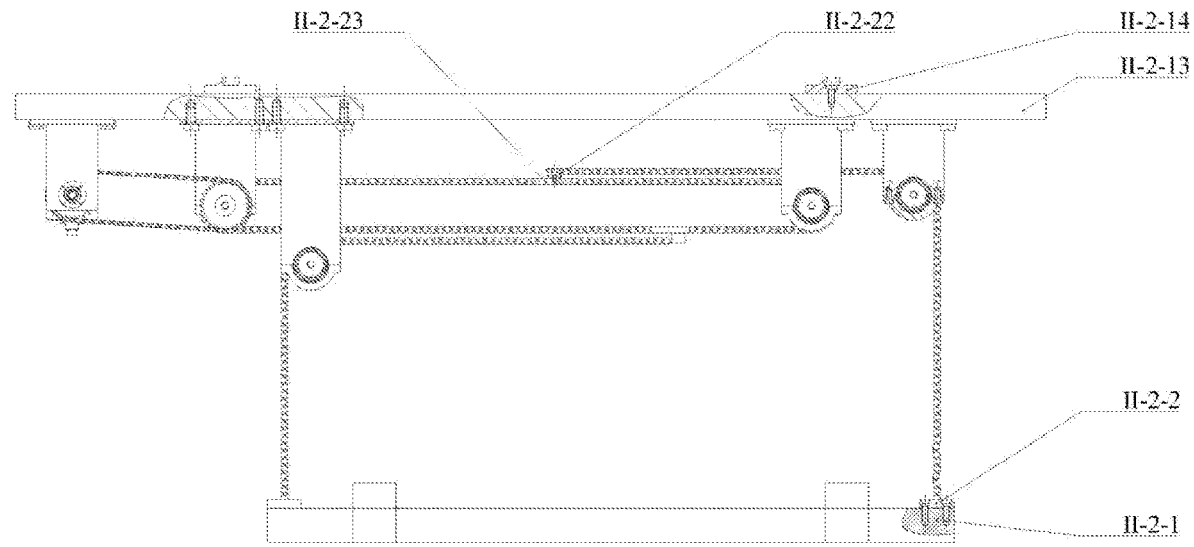
FIG. 10 is a partial sectional view of the material rack inserting and taking device in one or more embodiments of the present invention.

Further, as shown in FIGS. 9 and 10, the inserting and taking module comprises a load bearing assembly II-2-1, a mounting plate II-2-13, a track slot II-2-14 and a caterpillar band transmission mechanism being mounted under the mounting plate II-2-13; the caterpillar band transmission mechanism comprises a caterpillar band end connector II-2-2, a caterpillar band II-2-3, a caterpillar band gear II-2-10, a motor II-2-16, a motor mount II-2-17, a chain II-2-20, a sprocket II-2-21, a caterpillar band synchronizer II-2-22 and a caterpillar band synchronizer II-2-23.

The load bearing assembly II-2-1 comprises a load bearing body, and a load bearing block is mounted at the position near two ends on a first side of the load bearing body, and the load bearing block is hook-shaped. Further, the bearing block comprises a bearing part and a positioning part connected as a whole, and the positioning part is set above a surface of the bearing body; a surface of a first side of the positioning part and an upper surface of the bearing part form an L-shaped surface; wherein the upper surface of the bearing part is a bearing plane and a second side of the positioning part is a positioning plane. The load bearing block is inserted into the separating device inserting and taking slot I-1-2 or the separating device inserting and taking slot I-2-2 in the working process of the material rack separating device II, and then lift the load bearing assembly II-2-1 up to lift up one of the material rack for separation.

Further, a first end of the load bearing assembly II-2-1 is connected to a first end of the caterpillar band II-2-3 by the caterpillar band end connector II-2-2, and the caterpillar band II-2-3 bypasses the caterpillar band gear II-2-10 and of which a second end is connected to the caterpillar band synchronizer II-2-22; the caterpillar band synchronizer II-2-22 is connected to the caterpillar band synchronizer II-2-23, and the caterpillar band synchronizer II-2-23 connects a caterpillar band II-2-33 into a closed structure; the caterpillar band gears are mounted at both ends of the caterpillar band II-2-33 respectively. A lower part of the caterpillar band II-2-33 is connected with another caterpillar band bypassing the caterpillar band gear through the caterpillar band synchronizer II-2-23, and this caterpillar band is connected to a second end of load bearing assembly II-2-1 through the caterpillar band end connector. The caterpillar band gear at one end of the caterpillar band II-2-33 is connected with the sprocket II-2-21, and the sprocket II-2-21 is connected with the chain II-2-20.

The both ends of the caterpillar band II-2-3 are connected to the caterpillar band end connector II-2-2, the caterpillar band synchronizer II-2-22, the caterpillar band synchronizer II-2-23 and the caterpillar band II-2-33 respectively. The motor II-2-16 is mounted on the motor mount II-2-17, and the motor mount II-2-17 is mounted under the mounting plate II-2-1. In the working process, the motor II-2-16 is first started, and the rotation is transmitted to the shaft through a chain transmission of the chain II-2-20 and the sprocket II-2-21, which drives the rotation of the caterpillar band II-2-33, and a power is transmitted to the caterpillar band II-2-3 connected to the caterpillar band synchronizer II-2-22 by the caterpillar band synchronizer II-2-23. The caterpillar band II-2-3 rotates around the caterpillar band gear II-2-10 to convert a horizontal motion into a vertical motion, and the caterpillar band II-2-3 drives the load bearing assembly II-2-1 to move through the caterpillar band end connector II-2-2.

In the present embodiment, the forward and reverse rotation of the motor II-2-16 drives the lifting and lowering of load bearing assembly II-2-1, so as to realize the lifting, separation and lowering of one layer of the material rack. The material rack inserting and taking device II-2 constitutes a Z-axis moving of the material rack separating device II, and a pair of the material rack inserting and taking devices II-2, a pair of the tracks II-9, a pair of the cylinders II-10 and the top plate II-6 constitute a X-axis moving device of the material rack separating device II.

The timing belt synchronizing device comprises a number of synchronizers, the synchronizers are connected to the top plate II-6 by screws; the top plate II-6 cooperates with the Y-axis moving track slot II-5 to form the track for the Y-axis moving. In the present embodiment, the synchronizer is a connector with a tooth-shaped surface on a first side thereof, and the tooth-shaped surface of the synchronizer cooperates with the tooth shape of the synchronizing belt II-4-4. When the synchronizing belt II-4-4 moves, by the cooperation of the tooth surfaces, there can drive the Y-axis moving of the material rack inserting and taking device II-2 and other parts mounted on the top plate II-6, so as to realize the Y-axis moving of the material rack separating device II.

Figure 11:
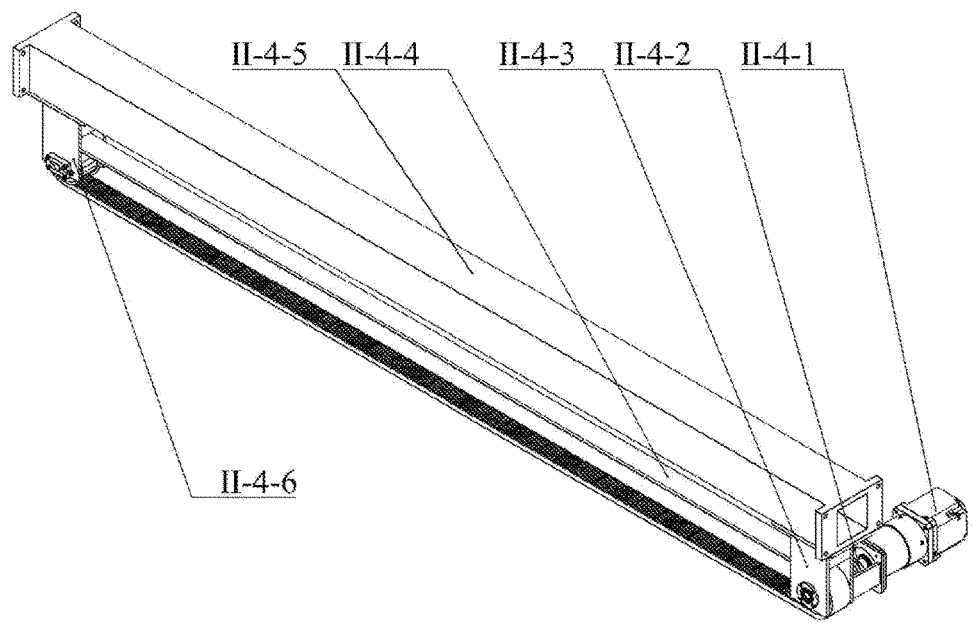
FIG. 11 is a schematic diagram of a Y-axis power device of the material rack in one or more embodiments of the present invention.

Further, as shown in FIG. 11, the material rack Y-axis power device II-4 comprises a motor II-4-1, a coupling II-4-2, a motor mount II-4-3, a timing belt II-4-4, a driving device frame II-4-5, and a driven pulley II-4-6. The driving device frame II-4-5 is fixed by screwing with the material rack separating support leg II-1 and the Y-axis moving track slot II-5 is fixed by screwing with the material rack separating support leg II-1. The motor II-4-1 is mounted on the motor mount II-4-3 and connected to the main pulley by the coupling II-4-2. The timing belt II-4-4 carries out a cooperation of belt and pulley with the main pulley and driven pulley II-4-6, and the timing belt II-4-4 is connected to the top plate II-6 through timing belt synchronizing device II-3. When the motor II-4-1 works, the main pulley connected to the coupling II-4-2 drives the timing belt II-4-4 to rotate, and the timing belt synchronizing device II-3 moves accordingly, to drive the top plate II-6 and the material rack inserting and taking device II-2 and other parts to carry out the Y-axis moving, so that the lifted partial material racks are moved in the Y-axis; after the material racks are put down, the device moves back to the initial position by reversing the motor.

Figure 12:
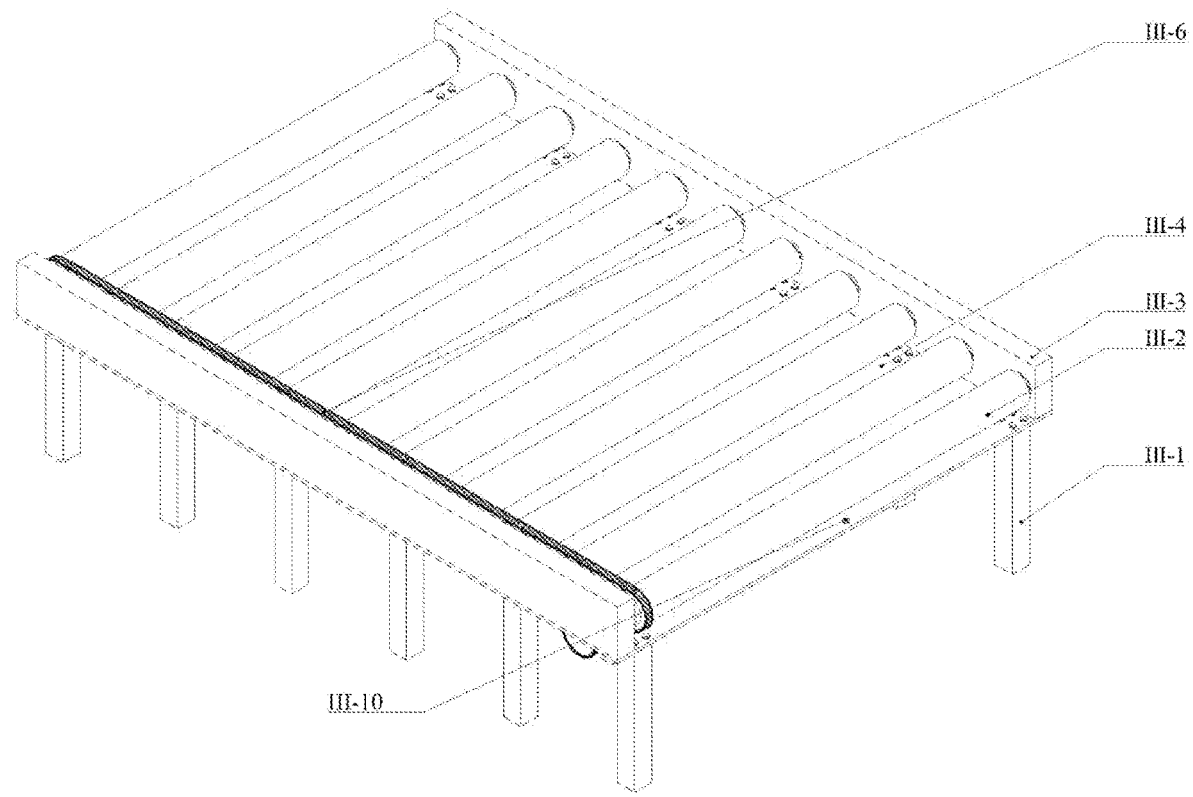
FIG. 12 is a structural diagram of a first roller table III in one or more embodiments of the present invention.
Figure 13:
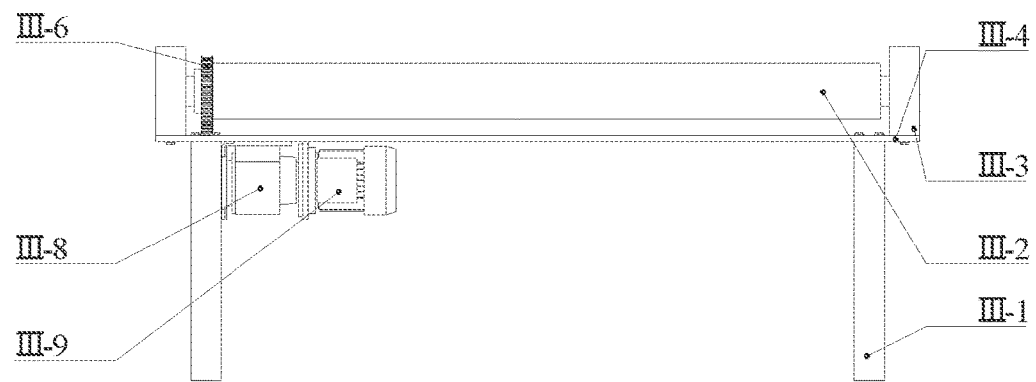
FIG. 13 is a side view of the first roller table III in one or more embodiments of the present invention.

Further, as shown in FIGS. 12 and 13, the first roller table III comprises a roller table leg III-1, a roller III-2, a mounting plate III-3, a base plate III-4, a chain III-6, and a motor III-9; the roller table leg III-1 is mounted below the base plate III-4, and mounting plates III-3 are set symmetrically along both sides parallel to the transmission way and fixed vertically with the base plate III-4. A plurality of rollers III-2 are distributed at intervals between the two mounting plates III-3, and a first end of the roller III-2 is connected to the motor III-9 through the chain III-6, and the rollers III-2 are driven to rotate under the action of the motor III-9 to drive the transportation of the material.

Figure 14:
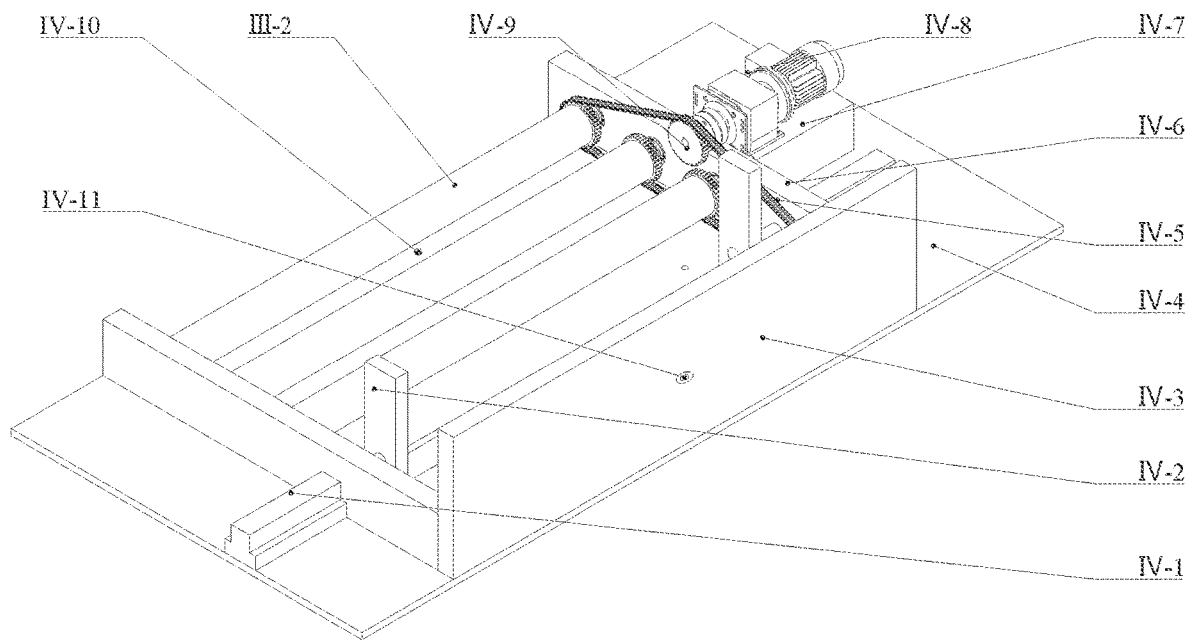
FIG. 14 is a schematic diagram of a second roller table IV in one or more embodiments of the present invention.

Further, as shown in FIG. 14, the second roller table IV comprises a cylinder IV-1, a positioning plate IV-2, a baffle plate IV-3, a roller IV-9, a base plate IV-4, a chain IV-5, a mounting plate IV-6, a motor seat IV-7, a motor IV-8, two mounting plates IV-6 parallel to each other mounted vertically at intervals above the base plate IV-4, and a plurality of the rollers IV-9 are connected between the two mounting plates IV-6, and the axis direction of the rollers IV-9 is the same as that of the rollers III-2 on the first roller table III. The rollers IV-9 are connected to the motor IV-8 through the chain, and the motor IV-8 is fixed above the base plate IV-4 through the motor seat IV-7, and the motor IV-8 drives the chain so as to realize the rotation of the rollers IV-9.

In the present embodiment, a first end of the mounting plate IV-6 away from the first roller track III is connected to the baffle plate IV-3, and two symmetrically set positioning plates IV-2 are provided between the baffle plate IV-3 and the adjacent roller IV-9 thereof, and the positioning plate IV-2 is perpendicular to the bottom plate IV-4. The positioning plate IV-2 is connected to the cylinder IV-1, and a distance between the two positioning plates IV-2 can be changed by the cylinder W-1, so as to realize the positioning of the separable material rack I. The displacement sensor IV-10 is mounted on the baffle plate IV-3, and is used check the distance between the wheel hub XI and the baffle plate IV-3, and to assist in positioning the separable material rack II.

Figure 15:
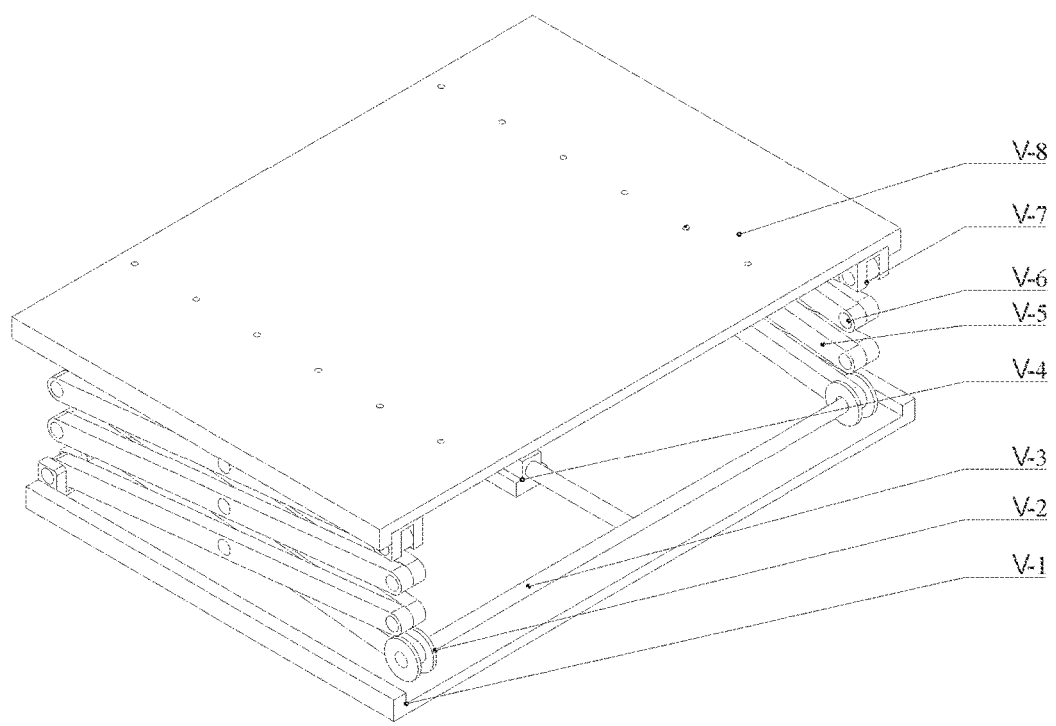
FIG. 15 is a schematic diagram of a lifting platform in one or more embodiments of the present invention.

Further, as shown in FIG. 15, the lifting platform V comprises a lifting base plate V-1, a roller V-2, a connecting shaft V-3, a cylinder V-4, a connecting rod V-5, a connecting pin V-6, a mounting bracket V-7 and a lifting top plate V-8. The lifting base plate V-1 and the lifting top plate V-8 are connected by mounting bracket V-7, the mounting bracket V-7 forms a scissors structure through the connection of the connecting rod V-5 and the connecting pin V-6.

In the present embodiment, setting two sets of scissors structure, a first end of a bottom side of the scissors structure is fixedly connected with the lifting bottom plate V-1, a second end of the bottom of the scissors structure is equipped with the roller V-2; a first end of a top side of the scissors structure is equipped with a roller V-2, and a second end of the top side of the scissors structure is fixedly connected with the lifting top plate V-8. The rollers V-2 on the bottom sides of the two sets of scissors structure are connected to each other through the connecting shaft V-3, the connecting shaft V-3 is connected to the cylinder V-4 and an expansion direction of the cylinder V-4 is perpendicular to the axis direction of the connecting shaft V-3.

Figure 16:
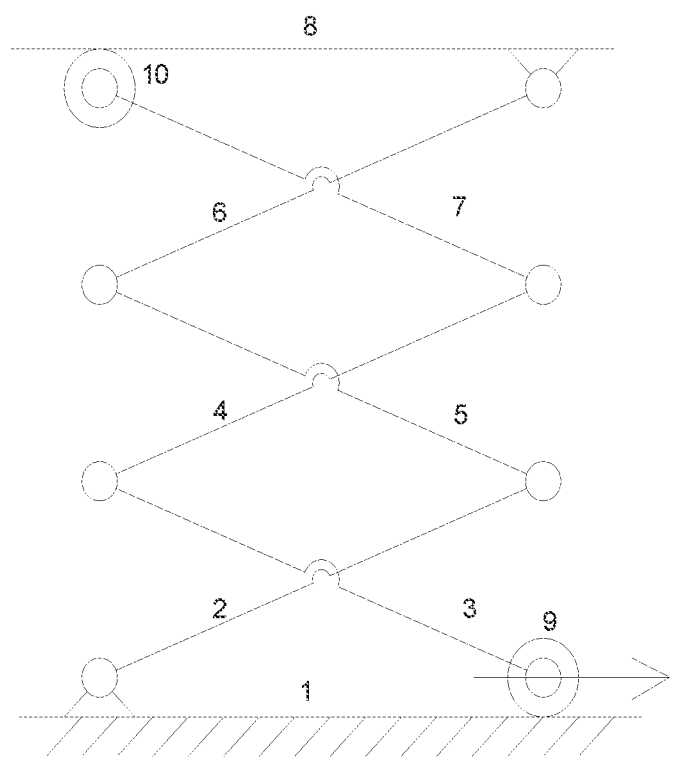
FIG. 16 is a movement diagram of the lifting table in one or more embodiments of the present invention.

Further, as shown in FIG. 16, label 1 is the lift base plate V-1 and remains stationary as a frame, labels 2-7 are the connecting rods V-5, wherein the labels 4-7 can be seen as virtual constraints of the labels 2 and 3, while labels 9 and 10 are local degrees of freedom. The local degrees of freedom of the lifting platform are calculated to be 1, and the lifting platform will have a determined motion law under an impetus of a power source cylinder. Therefore, $$F=3n-(2P_L+P_H-p)-P1=3\times9-(2\times11+2-4)-2=1 \tag{1}$$

wherein: F is the mechanism degrees of freedom; n is the number of members; $P_L$ is the number of low subs; $P_H$ is the number of high subs; p is the imaginary constraint; P1 is the local degrees of freedom.

Figure 17:
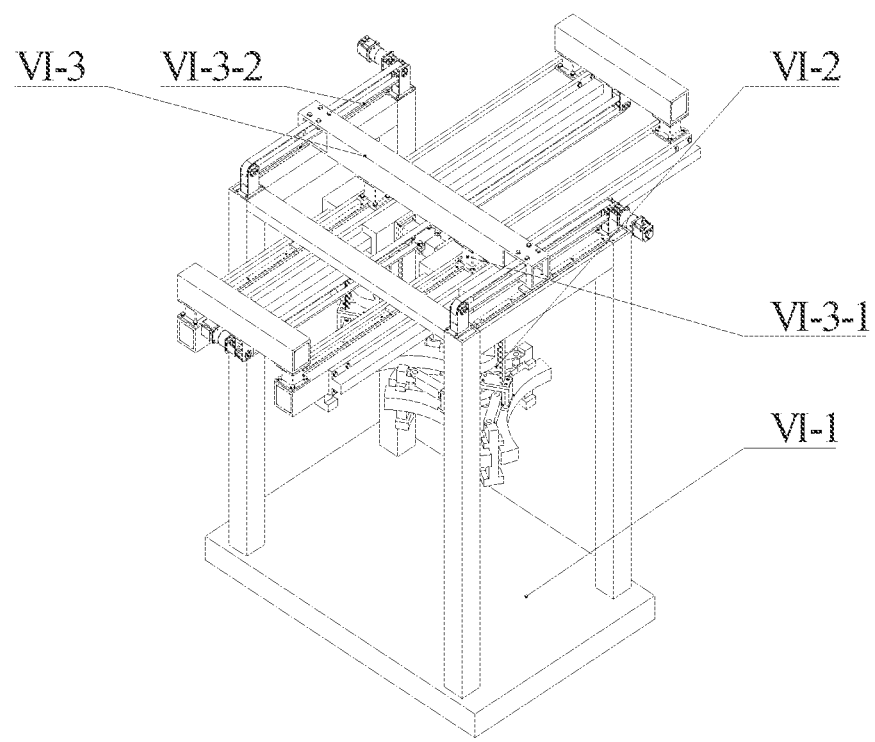
FIG. 17 is a structural diagram of a manipulator for gripping wheel hubs in one or more implementations of an embodiment of the present invention.

Further, as shown in FIG. 17, the manipulator VI comprises a bracket VI-1, a clamping device VI-2, and a Y-axis moving device VI-3. The bracket VI-1 is the frame of the wheel hub gripping manipulator, and the Y-axis moving device VI-3 is mounted on a top side of the bracket VI-1. In the present embodiment, the clamping device VI-2 is provided with two, which can complete the gripping and placing of two wheel hubs XI on one layer of material rack at one time. The clamping device VI-2 is slidingly connected to the bottom of the slide rail, and the slide rail are connected to each other by a connecting plate to form a moving frame; the moving frame is connected to the Y-axis moving device VI-3, and the moving frame is driven by the Y-axis moving device VI-3 to avoid affecting an action of the material rack inserting and taking device II-2.

Further, the clamping device VI-2 forms a linear motion pair with the slide rail, and the linear motion pair is connected to a power mechanism, the clamping device VI-2 is moved along the slide rail through the power mechanism. Wherein, the power mechanism adopts the existing linear driving mode, which is not repeated here. The Y-axis moving device VI-3 comprises a connecting frame VI-3-1, a timing belt mechanism VI-3-2. The connecting frame VI-3-1 is connected to the moving frame, and is connected to the timing belt mechanism VI-3-2. The moving frame can be driven to move along the Y-axis direction through the connecting frame VI-3-1 under the action of the timing belt mechanism VI-3-2.

Figure 18:
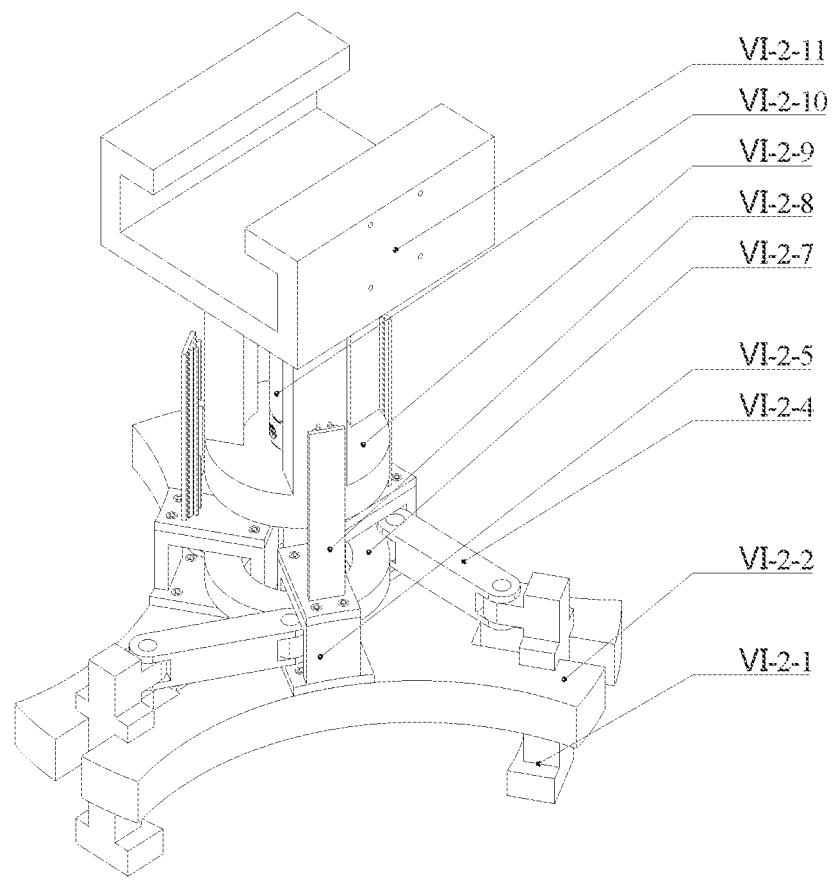
FIG. 18 is a structural diagram of a clamping device in one or more implementations of embodiments of the present invention.
Figure 19:
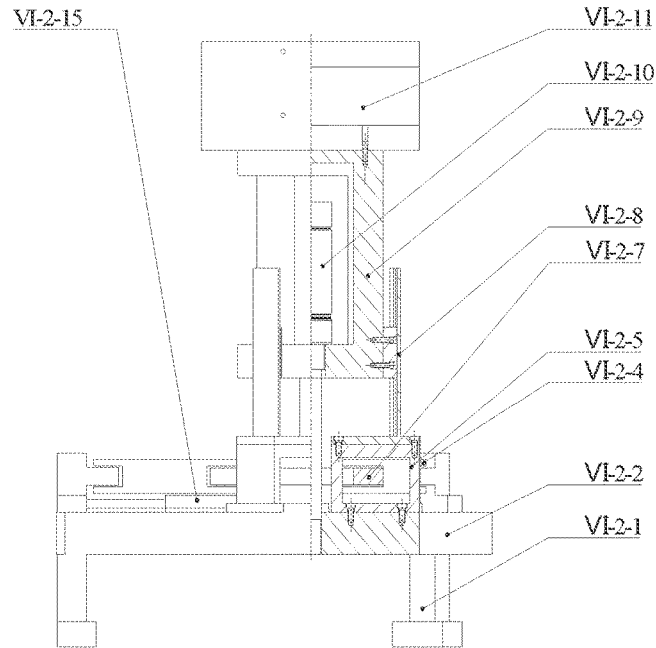
FIG. 19 is a semi-sectional view of the clamping device in one or more embodiments of the present invention.

As shown in FIGS. 18 and 19, the clamping device VI-2 comprises a slider VI-2-11 and a clamping part, the slider VI-2-11 is slidingly connected to the slide rail in the moving frame, and the clamping part is mounted under the slider VI-2-11. In the present embodiment, the clamping part comprises a plurality of jaws VI-2-1, for stable clamping, there is preferable to set three claws VI-2-1. The clamping part also comprises a mounting platform VI-2-2, a connecting frame VI-2-5, a bracket VI-2-9 and a connecting frame VI-2-5. The mounting platform VI-2-2 is circumferentially provided with slots with a number is same as the number of the jaws VI-2-1, and the jaws VI-2-1 can move along the slots.

The jaw VI-2-1 is hinged to a first end of a connecting rod VI-2-4, and a second end of the connecting rod VI-2-4 is hinged to a connecting frame VI-2-7. In the present embodiment, the connecting frame VI-2-7 is a ring-shaped structure, and there are three connecting rods VI-2-4 evenly distributed along a circumference of the connecting frame VI-2-7. The connecting frame VI-2-7 passes through the connecting frame VI-2-5. The connecting frame VI-2-5 is a rectangular frame. The connecting frame VI-2-5 is slidingly connected to the bracket VI-2-9 by a slide rail VI-2-8, wherein the slide rail VI-2-8 is set in a Z-direction; the bracket VI-2-9 is mounted under the slider VI-2-11, and forming a linear motion pair with the slide rail VI-2-8.

The bracket VI-2-9 is connected to a cylinder VI-2-10, and the bracket VI-2-9 can be moved along the slide VI-2-8 by the action of the cylinder VI-2-10. One of the jaws VI-2-1 is connected to a cylinder VI-2-15, and a synchronized movement of the three jaws VI-2-1 is realized under the action of the cylinder VI-2-15 and the connecting rod VI-2-4 for gripping or releasing the wheel hub XI.

Figure 20:
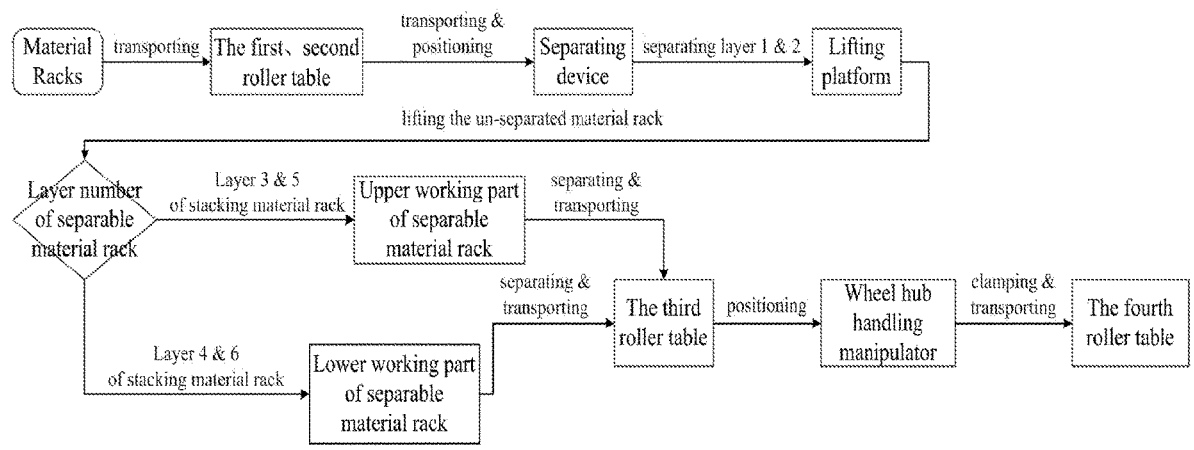
FIG. 20 is a workflow diagram of one or more embodiments of the present invention.

A transporting process of the separable material rack I in the present embodiment is shown in FIG. 20. Firstly, transporting the separable material rack I to the first roller table III by the forklift, the displacement sensor III-10 on the first roller table III sensing the separable material rack I and giving feedback to the system, the motor III-9 of the first roller table III is energized to start, then the separable material rack I being transported to the second roller table IV through the rotation of the roller III-2 driven by the chain III-6. After the displacement sensor IV-10 on the second roller table IV sensing the separable material rack I, the second roller table IV starts, and the motor IV-8 starts to work and drives the roller wheels III-2 mounted in the second roller table IV to rotate through the chain IV-5, which driving the separable material rack I to move forward; after encountering the stopper IV-3, the displacement sensor IV-11 sensing the separable material rack I and sending message to the control system, then the motor IV-8 of the second roller table IV stops running, and then the cylinders IV-1 on both sides are ventilated to push the positioning plate IV-2 to position the separable material rack I to make it stable on the second roller table IV. Calculating the position of the separable material rack I on the second roller table IV through the moving position of cylinder rod sensed by the electromagnetic induction in cylinder IV-1, which is prepared for the next step of splitting.

One end closed to the feeding roller table of the separable material rack I is as a "beginning end" of the work of the material rack separating device II, and one end closed to the manipulator VI is as a "finishing end" of the work of the material rack separating device II. In the two layers of working devices of the material rack separating device II, the upper layer of the working device is a "working part 1" and the lower layer of the working device is a "working part 2".

Specifically, a separating process of separable material rack I is: the material rack separating device II starts to work after when the separable material rack I being positioned on the second roller table IV. The motor II-4-1 starts, the "working part 1" travels from the "finishing end" to the "beginning end"; when reaching the "beginning end", the motor II-4-1 stops running, and then the cylinder II-10 is ventilated to push the material rack inserting and taking device II-2 moving on the X-axis; then the load bearing assembly II-2-1 is in contact with a "stacking material rack 1", and a positioning plane of the load bearing assembly II-2-1 positions the "stacked material rack 1"; After the positioning, the motor II-2-16 starts, making the load bearing assembly II-2-1 to lift up, and a load bearing plane of the load bearing assembly II-2-1 is in contact with the "stacking material rack 1", to lift up the "stacking material rack 1" and make it to be separated from the separable material rack I.

After the load bearing assembly II-2-1 is lifted to a certain height, the motor II-2-16 stops, and the motor II-4-1 starts, transporting the "working part 1" to the "finishing end", the lifting platform V on the "finishing end" rises and stops after lifting the second roller table IV mounted thereon up to a total height of five the stacking material racks; the motor II-2-16 reverses and the load bearing assembly II-2-1 drops, so that the "stacking material rack 1" falls on the second roller table IV, and then the cylinder II-10 is deflated and the upper material rack inserting and taking device II-2 is re-tracked. The lifting platform V drops to the initial position. After the second roller table IV positioned the "stacking material rack 1", the manipulator VI grabs the two wheel hubs on the "stacking material rack 1" at the same time, and places the wheel hubs on the fourth roller table VII, and the fourth roller table VII loads the wheel hubs into the machining section.

After the wheel hubs being picked up, starting the second roller table IV and the third roller table VIII at the "finishing end" to transport the "stacking material rack 1" in the other direction. The "working part 2" stays at the "finishing end" while the "working part 1" is moving from the "finishing end" to the "beginning end". When the "working part 1" drives to the "finishing end" after splitting the "stacking material rack 1", the "working part 2" starts to work in the same way as the above-mentioned "working part 1", disassembling the "stacking material rack 2" and moving to the "finishing end"; the lifting platform V at the "finishing end" raises and stops after lifting the second roller table IV mounted thereon up to a total height of four the stacking material racks; the motor II-2-16 reverses, the load bearing assembly II-2-1 drops, so that the "stacking material rack 2" falls on the second roller table IV, and then the cylinder II-10 is deflated, so that the upper material rack inserting and taking device II-2 is retracked.

Placing the wheel hubs on the fourth roller table VII through the grabbing of the manipulator VI, then the wheel hubs are loaded to the machining section. The second roller table IV and the third roller table VIII transport the "stacking material rack 2" away. The "working part 1" and "working part 2" repeat the above steps. The lifting platform V at the "beginning end", after the top two layers 1 and 2 of the separable material rack I are separated and moved away, can raises a height of two layers; and after the two layers 3 and 4 are separated and moved away, the lifting platform can raise the height of two layers again. After the two layers 5 and 6 are separated and moved away, the lifting platform V drops to the initial position and waits for the separable material rack I continued to be transported from the rear. The material rack separating device II, the first roller table III, the second roller table IV, the lifting platform V, the manipulator VI, the third roller table VIII and the fourth roller table VII repeat the above working process to complete the whole feeding process. One feeding process can complete the feeding of 12 wheel hubs loaded on a separable material rack I.

The foregoing descriptions are merely preferred embodiments of the present invention, but not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. An automatic feeding device for automotive wheel hub, comprising:
a separable material rack, comprising at least two layers of material rack units that comprise one layer of bottom material rack and at least one layer of stacking material rack; wherein, when the material rack units comprise several layers of stacking material racks, the stacking material racks are configured to stack on a top of each other and stack above the bottom material rack; wherein, each of the material rack units of the separable material rack is configured to carry up to two wheel hubs;

a first roller table, being connected to a first end of a second roller table and being configured to transport the separable material rack carrying wheel hubs to the second roller table; wherein, a lifting platform is mounted under a second end of the second roller table;

a material rack separating apparatus, comprising a support frame and at least two material rack inserting and taking devices arranged at intervals along a height direction of the support frame; wherein, the at least two material rack inserting and taking devices are configured to disassemble mechanically, under an action of the lifting platform, the separable material rack transported to the second roller table into the material rack units, and transport and place the material rack units on a third roller table layer by layer; and a manipulator, being provided on a first side of the third roller table, and being configured to grasp the wheel hubs out of the each of the material rack units transported to the third roller table and place the wheel hubs on a fourth roller table provided on one side of the manipulator that opposites to another side of the manipulator where the third roller table provided;

wherein, the second end of the second roller table is located below a first end of the material rack separating apparatus, the third roller table is arranged perpendicular to the direction of transmission of the second roller table, a first end of the third roller table is located below a second end of the material rack separating apparatus, and the first side of the third roller table is arranged close to an edge of the second end of the material rack separating apparatus;

wherein, the material rack separating apparatus further comprises:

at least two Y-axis power devices, being mounted along a length direction of the support frame; and a timing belt synchronizing device is used to connect each of the at least two Y-axis power devices to a corresponding material rack inserting and taking device thereof;

wherein, the each of the at least two Y-axis power devices is configured to drive, through the connection of the timing belt synchronizing device, the corresponding material rack inserting and taking device to move along the length direction of the support frame.

2. The automatic feeding device according to claim 1, wherein the each of the material rack units comprises a base plate and four stacking support legs distributed circumferentially along an upper surface of the base plate, a first end of the stacking support leg being removably connected to the base plate and a second end of the stacking support leg being plugged to a lower surface of the base plate of an adjacent material rack unit.

3. The automatic feeding device according to claim 2, wherein a plurality of wheel hub positioning plates are mounted on the upper surface of the base plate, and several inserting and taking slots are provided on a both sides of the base plate that along a width direction of the base plate; four first mounting slots, being configured to receive first ends of the four stacking support-leg is legs correspondingly, are provided near four corners of the upper surface of the base plate, and four second mounting slots, being configured to receive second ends of the four stacking support legs correspondingly, are provided on the lower surface of the base plate corresponding to positions of the four first mounting slots, and each of the four second mounting slots is provided with a seat for connecting each of the four stacking support legs correspondingly in a mean of plug-in.

4. The automatic feeding device according to claim 3, wherein an upper surface of each of the plurality of wheel hub positioning plates is provided with a plurality of positioning shafts each of which an axis line is perpendicular to the upper surface; the seat comprises a seat inner frame, a seat outer frame and a roller mounted between the seat inner frame and the seat outer frame and protruding from a surface of the seat inner frame.

5. The automatic feeding device according to claim 1, wherein each of the at least two material rack inserting and taking devices comprises a top plate, an inserting and taking module, a cylinder and a track; wherein, the track is mounted on a bottom surface of the top plate, the inserting and taking module is slidingly connected to the track, the cylinder is connected to the inserting and taking module;

wherein, the inserting and taking module is configured to move, under the action of the cylinder, along a length direction of the separable material rack to be inserted into one of the material rack units, wherein the moving direction of the inserting and taking module is perpendicular to the length direction of the support frame.

6. The automatic feeding device according to claim 5, wherein the inserting and taking module comprises a mounting plate, a caterpillar band transmission mechanism and a load bearing assembly; wherein, the load bearing assembly is connected to the mounting plate through the caterpillar band transmission mechanism, the mounting plate is slidingly connected to the track; the caterpillar band transmission mechanism is configured to drive the load bearing assembly to lift.

7. The automatic feeding device according to claim 1, wherein a baffle is mounted at an edge of the second end of the second roller table, and a positioning plate is provided on a side of the baffle near the second roller table and is connected to a cylinder; a displacement sensor is mounted on the second roller table.

8. The automatic feeding device according to claim 1, wherein the lifting platform comprises a lifting top plate, a lifting bottom plate and two sets of structure, structures; wherein, the lifting top plate and the lifting bottom plate are connected by the two sets of scissor structures, a roller is provided on one of two diagonal ends of each of the two sets of scissor structures, wherein, two rollers provided on the two sets of scissor structures correspond to each other and are connected with each other by a connecting shaft; and, a cylinder is connected to the connecting shaft.

9. The automatic feeding device according to claim 1, wherein the manipulator comprises a bracket, a plurality of clamping devices; wherein, each of the plurality of clamping devices is connected to the bracket through a moving frame, and a Y-axis moving device is connected to the moving frame.

* * * * *